(12) United States Patent
Fernandez

(10) Patent No.: US 8,762,024 B2
(45) Date of Patent: Jun. 24, 2014

(54) AUTOMATIC MANAGING SYSTEM OF ENGINE CONTROL MODES OF A MULTI-ENGINE AIRCRAFT

(75) Inventor: Brice Fernandez, Toulouse (FR)

(73) Assignee: Airbus Operations (SAS), Toulouse (FR)

( * ) Notice: Subject to any disclaimer, the term of this patent is extended or adjusted under 35 U.S.C. 154(b) by 526 days.

(21) Appl. No.: 12/789,175

(22) Filed: May 27, 2010

(65) Prior Publication Data

US 2010/0305826 A1    Dec. 2, 2010

(30) Foreign Application Priority Data

Jun. 2, 2009 (FR) ...................................... 09 02632

(51) Int. Cl.
*G06F 19/00* (2011.01)

(52) U.S. Cl.
USPC .................... 701/99; 701/3; 244/76 R; 477/2; 123/512

(58) Field of Classification Search
CPC ..................... B60W 10/06; B60W 2510/0604; B60W 2510/0609; B60W 2510/06; B60W 2510/00; B60W 2510/0614; B60W 2510/0623; B60W 2510/0638
USPC ........... 701/3, 99; 244/76 R; 477/2, 151, 902; 290/51; 123/512; 60/906
See application file for complete search history.

(56) References Cited

U.S. PATENT DOCUMENTS

| | | | |
|---|---|---|---|
| 3,174,284 A | | 3/1965 | McCarthy |
| 3,813,063 A | * | 5/1974 | Martin .......................... 244/182 |
| 4,151,595 A | * | 4/1979 | Pressiat ......................... 701/120 |
| 4,205,814 A | * | 6/1980 | Larson et al. ................. 244/182 |
| 4,220,993 A | * | 9/1980 | Schloeman .................... 701/100 |
| 4,241,450 A | * | 12/1980 | Blatter et al. .............. 455/182.3 |
| 4,303,976 A | | 12/1981 | Joby |
| 4,569,021 A | * | 2/1986 | Larson et al. ................... 701/99 |
| 4,875,168 A | * | 10/1989 | Martin ............................ 701/99 |
| 5,044,155 A | * | 9/1991 | Zimmerman ................... 60/224 |
| 5,048,285 A | * | 9/1991 | Schmitt et al. ................. 60/204 |
| 5,873,546 A | | 2/1999 | Evans et al. |
| 5,927,655 A | * | 7/1999 | Larramendy et al. ......... 244/195 |
| 5,986,580 A | * | 11/1999 | Permanne ..................... 340/946 |
| 6,487,847 B1 | | 12/2002 | Snow et al. |
| 6,742,742 B2 | * | 6/2004 | Claudet ...................... 244/17.13 |
| 6,898,491 B2 | * | 5/2005 | Muller et al. ..................... 701/3 |
| 8,025,503 B2 | * | 9/2011 | Gates et al. ..................... 434/35 |
| 8,050,808 B2 | * | 11/2011 | Delporte et al. .................. 701/5 |
| 8,359,129 B2 | * | 1/2013 | Lemaignan et al. .............. 701/8 |

(Continued)

FOREIGN PATENT DOCUMENTS

EP    0384991    9/1990

OTHER PUBLICATIONS

French Search Report issued on Feb. 5, 2010 in France Appln. No. 0902632. (3 pages).

*Primary Examiner* — Thomas Black
*Assistant Examiner* — Sara Nelson
(74) *Attorney, Agent, or Firm* — Novak Druce Connolly Bove + Quigg LLP

(57) ABSTRACT

A system for automatically managing engine control modes of a multi-engine aircraft is disclosed. The system (1) can comprise means (5, 7, 8, 9, 10) for automatically switching all the controlling units (2) of the engines of the aircraft to an alternative controlling mode, as soon as one of such controlling units (2) is brought to such an alternative controlling mode.

6 Claims, 2 Drawing Sheets

(56) References Cited

U.S. PATENT DOCUMENTS

| | | | |
|---|---|---|---|
| 2005/0071072 A1* | 3/2005 | Mangelsdorf | 701/100 |
| 2005/0194494 A1* | 9/2005 | MacDougall | 244/76 R |
| 2005/0234609 A1* | 10/2005 | Villaume et al. | 701/15 |
| 2005/0234689 A1* | 10/2005 | Gates et al. | 703/8 |
| 2006/0080008 A1* | 4/2006 | Ishihara et al. | 701/4 |
| 2008/0140268 A1* | 6/2008 | Todini | 701/3 |
| 2008/0275597 A1 | 11/2008 | Gaulmin et al. | |
| 2009/0018714 A1* | 1/2009 | Lemaignan et al. | 701/3 |
| 2010/0024536 A1* | 2/2010 | Adibhatla et al. | 73/112.01 |

* cited by examiner

AUTOMATIC MANAGING SYSTEM OF ENGINE CONTROL MODES OF A MULTI-ENGINE AIRCRAFT

CROSS-REFERENCE TO RELATED APPLICATIONS

This application claims priority to French Patent Application 0902632, filed Jun. 2, 2009, the contents of which are incorporated herein by reference.

FIELD OF THE INVENTION

The present invention relates to a system for automatically managing control modes for engines of a multi-engine aircraft.

BACKGROUND OF THE INVENTION

Within the framework of the present invention, said system comprises a plurality of controlling units, preferably of the EEC ("Electronic Control Computer") type, being respectively associated to the engines of the aircraft, in particular a transport airplane. Each one of such controlling units comprises more specifically means for determining a engine controlling parameter.

As the thrust of a engine cannot be directly known, it is known that each engine manufacturer selects a particular parameter being representative of the thrust of the engine, whatever the operating conditions thereof. Such a engine controlling parameter is generally a complex parameter determined from different data. It could more specifically be an engine pressure ratio of the EPR ("Engine Pressure Ratio") type representing a ratio between the pressure at the inlet and that at the outlet of the engine. Such an engine controlling parameter, with respect to which the performance of the engine is optimized, is used during the normal operation of the engine in a so-called "main controlling mode" controlling mode.

However, it can happen that a controlling unit is not able to determine said controlling parameter for the engine it is monitoring, for example when one of the data to be used for the determination thereof is not available or is erroneous. Thus, it is generally provided for that each controlling unit is able to determine an auxiliary controlling parameter, for example, the speed N1 of the low pressure compressor of the engine, being associated to a so-called "alternative controlling mode" controlling mode. Consequently, when the engine controlling parameter being associated to the main controlling mode is no longer available on a controlling unit, the latter is automatically brought in an alternative controlling mode, for which it provides said auxiliary engine controlling parameter. However, the performance of the engine is not optimized with respect to such an auxiliary engine controlling parameter so that, in such an alternative controlling mode, the engine is less performing than in the main controlling mode, for some flight conditions.

It is known that generally the engine controlling parameter actually used for by the controlling unit is displayed on a usual system for displaying engine parameters in the cockpit of the aircraft.

Thus, more particularly for maintaining some consistency between information relating to engines, being presented to the crew, it is necessary that the different controlling units use the same engine controlling parameter. This is why, when the main controlling parameter of an engine of the aircraft is lost and the corresponding controlling unit is brought in its alternative controlling mode, the pilot is made aware of such a situation. In such a situation, the pilot is requested to manually switch all the other controlling units in their alternative controlling mode, using usual actuating means, in particular a button, being available in the cockpit.

Moreover, if subsequently the breakdown resulting in such a mode switch disappears, the pilot is requested to actuate again such switching means for returning the controlling units to their main controlling mode.

Such a controlling mode switch, intended for obtaining a consistency of the parameters of engine control to be used and displayed, thus requires the pilot's intervention, representing a significant work load. In addition, if the breakdown resulting in a controlling mode switch is irregular, for example, upon a bad contact, it can happen that the pilot must regularly actuate the actuating means for, each time, controlling the appropriate engine controlling mode.

SUMMARY OF THE INVENTION

The present invention relates to a system for automatically managing the controlling modes for the engines of a multi-engine aircraft, allowing for the above described drawbacks to be overcome.

To this end, according to this invention, said system of the type comprising a plurality of controlling units being respectively associated with the engines of the aircraft, each one of said controlling units comprising first means for determining a first engine controlling parameter associated with a main controlling mode, second means for determining a second engine controlling parameter associated with an alternative controlling mode, and switching means for performing the switch between said main controlling mode and said alternative controlling mode, one single controlling mode, referred to as the common controlling mode being used at a given instant, said main controlling mode being in normal operation and said alternative controlling mode being used at least when said fist engine controlling parameter cannot be determined, is remarkable in that each one of said controlling units further comprises third means able to automatically emit mode information indicating the common controlling mode, and in that said system further comprises:

data transmitting means linking the controlling units of different engines to at least one monitoring unit; and said monitoring unit comprising first means for automatically monitoring the mode information emitted by said controlling units so as to detect a situation, wherein at least one controlling unit is in an alternative controlling mode, and second means for automatically emitting, upon such a detection, at least one control signal intended to the other controlling units so as to automatically control the switching means being of the controllable type of such other controlling units in order to all switch them to their alternative controlling mode.

Thus, according to this invention, when a first engine controlling parameter (relating to a main controlling mode) is no longer available on one of the controlling units of the engines of the aircraft, the system according to this invention automatically brings all the controlling units in their alternative controlling mode, so that they all use the same second engine controlling parameter (being associated with such an alternative controlling mode). Thus, a consistency of the engine controlling parameters to be used is obtained, more particularly for being presented to the crew of the aircraft.

Besides, as the system according to this invention is automatic, it reduces the pilot's work load, the pilot only having to manage the controlling modes of said controlling units, in particular upon a breakdown impacting an engine controlling parameter.

Furthermore, advantageously, said first means of said monitoring unit are arranged so as to be able to automatically detect returning to a normal controlling mode, after a previous switch of the controlling mode from a main controlling mode to an alternative controlling mode, and said second means of said monitoring unit are arranged so as to emit a control signal in such a situation in order to switch again all the controlling units to their main controlling mode.

Thus, when the breakdown resulting in a controlling mode switch disappears, the system according to this invention automatically brings the different controlling units back to their main controlling mode, for which they use said first engine controlling parameter being the optimum parameter.

In a preferred embodiment, said monitoring unit comprises:
- an OR logic gate receiving at the entries thereof mode information from all the controlling units;
- a time confirmation means being arranged at the outlet of said OR logic gate; and
- a toggle being provided at the outlet of said time confirmation means and being able to generate a control signal.

Furthermore, in order to avoid continual controlling mode switches, in particular when an untimely breakdown results in a loss of the first engine controlling parameter, said automatic management system could comprise inhibition means for preventing any additional switch of the controlling mode, when a predetermined number of controlling mode switches has already been implemented during a flight.

The present invention further relates to a multi-engine aircraft, in particular a multi-engine transport airplane, comprising a system such as previously mentioned for automatically managing controlling modes of engines of said aircraft.

BRIEF DESCRIPTION OF THE DRAWINGS

The figures of the appended drawing will better explain how this invention can be implemented. In these figures, like reference numerals relate to like components.

DETAILED DESCRIPTION

Figure 1:
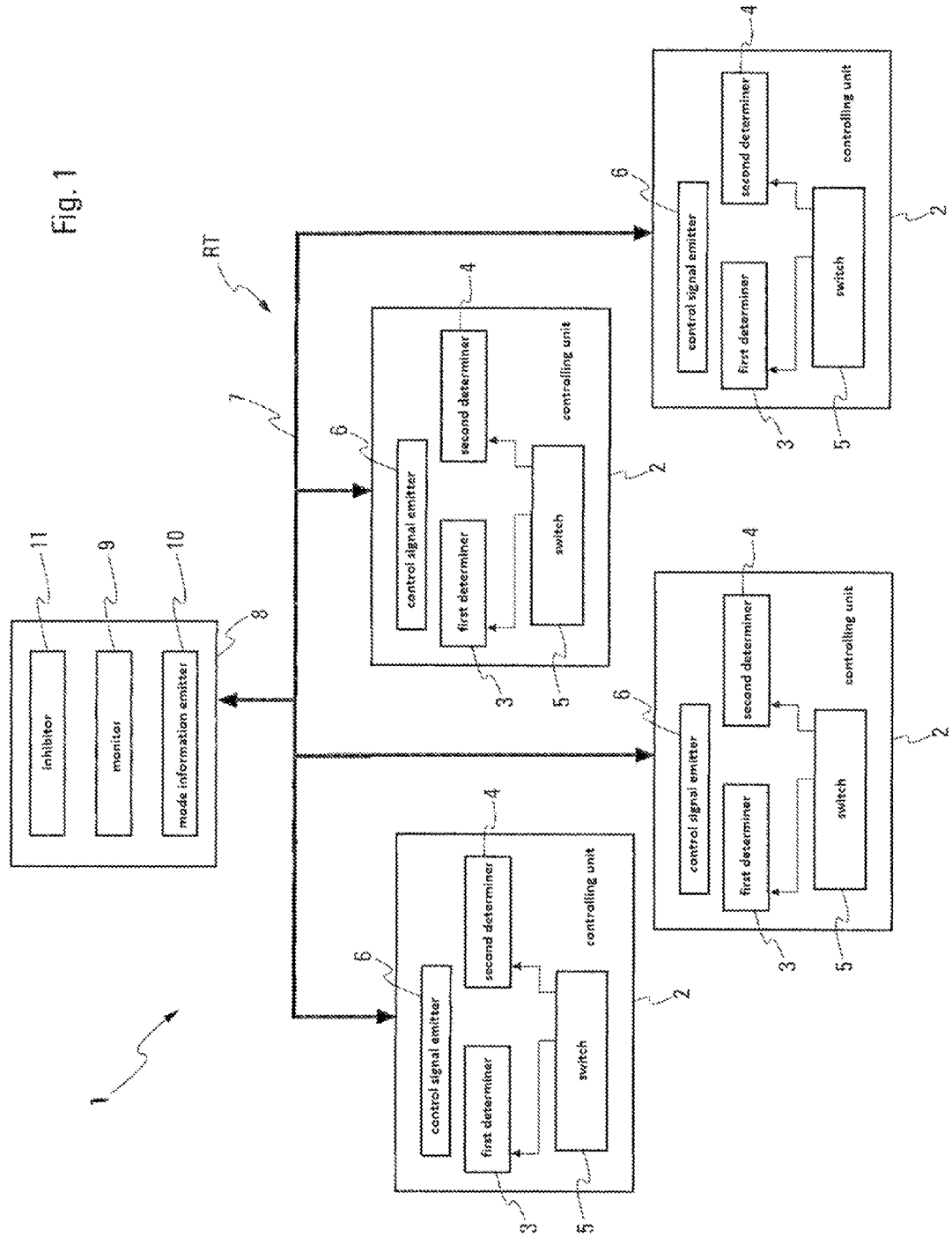
FIG. 1 is the block diagram of an automatic management system according to this invention.

The system 1 according to this invention and schematically illustrated on FIG. 1 is intended for automatically managing controlling modes of the engines of a multi-engine aircraft (not shown), in particular of a multi-engine transport airplane.

Such a system 1 comprises a plurality of controlling units 2 intended for, usually, controlling the engines of the aircraft, for example a four-engine aircraft. Each engine comprises such a controlling unit 2 preferably being an EEC type ("Electronic Engine Control") digital electronic regulation unit.

According to this invention, in addition to usual elements (not shown) being intended, more specifically, to controlling the associated engine, each one of said controlling units 2 comprises:
- means 3 for usually determining a first engine controlling parameter, for example a EPR type engine pressure ratio, being associated with a main controlling mode, an engine controlling parameter being representative of the thrust of the engine, whatever the operating conditions thereof;
- means 4 for usually determining a second engine controlling parameter, for example the speed N1, being associated with an alternative controlling mode; and
- switching means 5 for implementing switching between said main controlling mode and said alternative controlling mode.

A single controlling mode referred to as a "common controlling mode" is used at a given instant. In particular, said main controlling mode is used in normal operation, and said alternative controlling mode is used at least when said first engine controlling parameter cannot be determined.

According to the invention, each one of said controlling units 2 also comprises means 6 that are able to automatically emit a mode information indicating the common controlling mode.

In addition, according to this invention, said system 1 also comprises:
- data transmitting means 7 linking the controlling units 2 of the different engines to at least one monitoring unit 8. Said data transmission means 7 are, preferably, part of a usual network RT of data transmission of the aircraft, for example, of the AFDX type; and
- said monitoring unit 8 comprising means 9 for automatically monitoring the mode information (i.e. the name of the common controlling mode) emitted by said controlling units 2 (and received via means 7) so as to be able to detect a situation, wherein at least one controlling unit 2 is in its alternative controlling mode, and means 10 for automatically emitting, upon such a detection, at least one control signal intended to the controlling units 2 (other than that being in its alternative controlling mode) so as to automatically control the switching means 5 (being of the controllable type according to the invention, that is that can be controlled from outside via the means 7) of such other controlling units, so that they all use their alternative controlling mode.

Thus, when a first engine controlling parameter (being associated with a main controlling mode) is no longer available on one of the controlling units 2 of the engines of the aircraft, the system 1 according to this invention automatically brings all the controlling units 2 to their alternative controlling mode, so that they all use the same second engine controlling parameter (being associated with this alternative controlling mode). Thus, a consistency is usually obtained of the engine controlling parameters being usually used and which are, more specifically, presented to the crew of the aircraft.

Moreover, as the system according to this invention is automatic, it reduces the pilot's work load, who only has to manage the controlling modes of said controlling units 2, in particular upon a breakdown impacting an engine controlling parameter.

In a preferred embodiment, said means 9 of said monitoring unit 8 are arranged so as to be able to automatically detect returning to a normal controlling mode, after a previous switch of the controlling mode from a main controlling mode to an alternative controlling mode (for at least one controlling unit 2), and said means 10 of said monitoring unit 9 are arranged so as to be able to emit a control signal in such a situation.

Thus, when the breakdown resulting in such a controlling mode switch disappears, the system 1 according to this invention automatically brings the different controlling units 2 back to their main controlling mode, for which they use said first engine controlling parameter, for example, the EPR ratio, with respect to which the performance of the engine has been optimized.

Additionally, in a particular embodiment, said system 1 further comprises inhibition means 11 being, preferably, integrated into the monitoring unit 8 and being arranged so as to prevent any controlling mode switch, when a predetermined number (one, two, three, ... ) of controlling modes switches has already been implemented during the on going flight. Such a particular embodiment allows for continual controlling mode switches to be prevented, in particular when an untimely breakdown results in a loss of the first engine controlling parameter.

Figure 2:
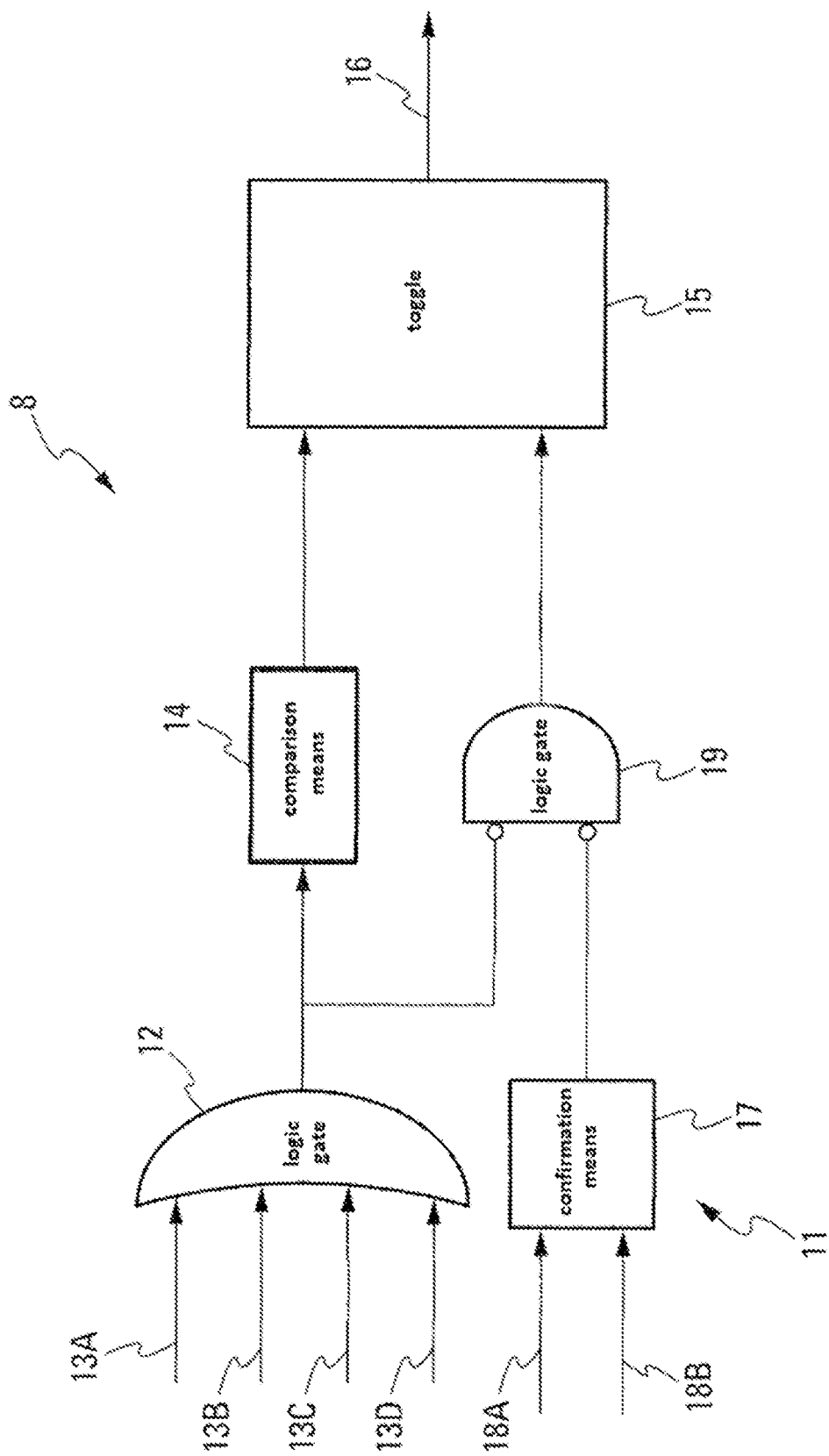
FIG. 2 is the block diagram of a monitoring unit being part of a system according to this invention.

Furthermore, in a preferred embodiment shown on FIG. 2, said monitoring unit 8 comprises:
- an OR logic gate 12 receiving at the entries thereof, via links 13A, 13B, 13C and 13D, the mode information respectively emitted by all the controlling units 2. As long as the mode information emitted by said controlling units 2 indicate, as the common controlling mode, the main controlling mode, the latter sends a value "0" to the OR logic gate 12. On the other hand, a controlling unit transmits a value "1" to the OR logic gate 12 as soon as it is switched to its alternative controlling mode. The outlet of the OR logic gate 12 thus stands at a value "0" whereas the different controlling units 2 all stand in their main controlling mode, and it shows a value "1" as soon as one of said controlling units 2 is brought to its alternative controlling mode;
- a time confirmation means 14 being arranged at the outlet of said OR logic gate 12 and emitting at its outlet a value "1", if a value "1" is emitted for a predetermined duration, for example three seconds, at the outlet of the OR logic gate 12; and
- a toggle 15, having the entry S thereof connected to the outlet of said time confirmation means 14, and being able to generate a control signal via a link 16 (to the controlling units 2 via the means 7).

Said monitoring unit 8 further comprises said inhibition means 11 comprising:
- a comparison means 17 being intended to compare the number (received by a link 18A) of mode switches already implemented at a predetermined value, for example two or three, being recorded or received by a link 18B; and
- n AND logic gate 19 being connected to the outlets respectively of said OR logic gate 12 and of said comparison means 17, and having the outlet thereof connected to an input R of the toggle 15.

The invention claimed is:

1. A system for automatically managing controlling modes in engines of a multi-engine aircraft, said system comprising:
   (A) a plurality of controlling units respectively associated with the engines of the aircraft, each one of said controlling units comprising:
      (A1) a first engine controlling parameter determiner configured to determine a first engine controlling parameter associated with a main controlling mode,
      (A2) a second engine controlling parameter determiner configured to determine the second engine controlling parameter associated with an alternative controlling mode,
      (A3) a controllable switch, wherein the switch is adjustable between said main controlling mode and said alternative controlling mode,
         wherein one single controlling mode referred to as a common controlling mode is used at a given instant,
         wherein said main controlling mode is used in normal operation, and
         wherein said alternative controlling mode is used at least when said first engine controlling parameter cannot be determined, and
      (A4) a mode information emitter configured to automatically emit mode information indicating the common controlling mode; and
   (B) a data transmitter, linking the controlling units of the different engines to at least one monitoring unit, wherein said monitoring unit comprises:
      (B1) a monitor configured to monitor the mode information emitted by said controlling units so as to be able to detect a situation wherein at least one controlling unit is in the alternative controlling mode thereof, and
      (B2) a control signal emitter configured to automatically emit at least one control signal to each of the controlling units and to automatically control the controllable switch of each of the controlling units so as to switch each of the controlling units to the alternative controlling mode thereof, when the monitor detects the situation wherein at least one controlling unit is in the alternative controlling mode.

2. The system according to claim 1, wherein the first engine controlling parameter determiner is configured to automatically detect returning to a normal controlling mode, after a previous switch of the controlling mode from a main controlling mode to an alternative controlling mode, and
   wherein the second engine controlling parameter determiner is configured to emit a control signal to switch all the controlling units to the main controlling mode thereof, when the first engine controlling parameter determiner detects returning to the normal controlling mode, after the previous switch of the controlling mode from the main controlling mode to the alternative controlling mode.

3. The system according to claim 1, wherein said monitoring unit comprises:
   an OR logic gate receiving at the entries thereof, mode information from all the controlling units;
   a time confirmation means being arranged at the outlet of said OR logic gate; and
   a toggle being provided at the outlet of said time confirmation means and being able to generate a control signal.

4. The system according to claim 1, comprising an inhibitor configured to prevent any additional switch of the controlling mode, when a predetermined number of controlling mode switches has already been implemented during a flight.

5. An aircraft, comprising a system (1) such as that specified in claim 1.

6. A system for automatically managing controlling modes in engines of a multi-engine aircraft, said system comprising:
   (A) a plurality of controlling units respectively associated with the engines of the aircraft, each one of said controlling units comprising:
      (A1) a first engine controlling parameter determiner configured to determine a first engine controlling parameter associated with a main controlling mode,
      (A2) a second engine controlling parameter determiner configured to determine the second engine controlling parameter associated with an alternative controlling mode,
      (A3) a controllable switch, wherein the switch is adjustable between said main controlling mode and said alternative controlling mode,
      (A4) a mode information emitter configured to automatically emit mode information indicating the common controlling mode, wherein one single controlling mode referred to as a common controlling mode is used at a given instant, wherein said main controlling mode is used in normal operation, and wherein said alternative controlling mode is used at least when said first engine controlling parameter cannot be determined, wherein the first engine controlling parameter determiner is configured to automatically detect returning to a normal controlling mode, after a previous switch of the controlling mode from a main controlling mode to an alternative controlling mode, wherein the second engine controlling parameter determiner is configured to emit a control signal to switch all the controlling units to the main controlling mode thereof, when the first engine controlling parameter determiner detects returning to the normal controlling mode, after the previous switch of the controlling mode from the main controlling mode to the alternative controlling mode; and (B) a data transmitter, linking the controlling units of the different engines to at least one monitoring unit, wherein said monitoring unit comprises:

(B1) a monitor configured to monitor the mode information emitted by said controlling units so as to be able to detect a situation wherein at least one controlling unit is in the alternative controlling mode thereof, and (B2) a control signal emitter configured to automatically emit at least one control signal to each of the controlling units and to automatically control the controllable switch of each of the controlling units so as to switch each of the controlling units to the alternative controlling mode thereof, when the monitor detects the situation wherein at least one controlling unit is in the alternative controlling mode.

* * * * *